(12) United States Patent
Ohba (10) Patent No.: US 8,194,718 B2
(45) Date of Patent: Jun. 5, 2012

(54) RECEIVING APPARATUS AND SIGNAL PROCESSING METHOD

(75) Inventor: Hideo Ohba, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 1100 days.

(21) Appl. No.: 12/078,565

(22) Filed: Apr. 1, 2008

(65) Prior Publication Data
US 2008/0253431 A1 Oct. 16, 2008

(30) Foreign Application Priority Data
Apr. 2, 2007 (JP) ................................ 2007-096412

(51) Int. Cl.
*H04B 1/00* (2006.01)
(52) U.S. Cl. ........ 375/136; 375/147; 375/260; 375/316; 375/322; 375/344; 455/284; 455/296; 455/324
(58) Field of Classification Search .................. 375/130, 375/135, 136, 145, 147, 150, 219, 220, 259, 375/295, 299, 316, 342, 346, 350, 260, 349
See application file for complete search history.

(56) References Cited

U.S. PATENT DOCUMENTS

| | | | |
|---|---|---|---|
| 7,190,216 B2* | 3/2007 | Saijo et al. ................. | 329/304 |
| 7,310,506 B2* | 12/2007 | Tsukizawa et al. .......... | 455/264 |
| 7,342,464 B2* | 3/2008 | Hino ............................ | 331/167 |
| 7,454,186 B2* | 11/2008 | Yoneda et al. ............... | 455/324 |
| 2003/0224752 A1* | 12/2003 | Rawlins et al. .............. | 455/307 |
| 2006/0240779 A1* | 10/2006 | Rostami et al. .............. | 455/63.1 |
| 2007/0058738 A1* | 3/2007 | Mahadevappa et al. ...... | 375/260 |
| 2007/0177653 A1* | 8/2007 | Bjerede ........................ | 375/130 |
| 2007/0207764 A1* | 9/2007 | Watanabe et al. ............ | 455/337 |
| 2007/0218856 A1* | 9/2007 | Vilhonen ...................... | 455/323 |
| 2008/0150689 A1* | 6/2008 | Chiu et al. ................... | 340/10.1 |
| 2009/0022246 A1* | 1/2009 | Ando ........................... | 375/319 |
| 2010/0323649 A1* | 12/2010 | Schmidt ...................... | 455/188.1 |

FOREIGN PATENT DOCUMENTS
| | | |
|---|---|---|
| JP | 2004-172693 | 6/2004 |
| JP | 2006-203686 | 8/2006 |

OTHER PUBLICATIONS

"High Rate Ultra Wideband PHY and MAC Standard", Ecma international standard ECMA-368 1st Edition, (Dec. 2005, pp. 7, 14-16).
Satoshi Tanaka, et al.. "GSM/DCS1800 Dual Band Direct-Conversion Transceiver IC with a DC Offset Calibration System", Solid-State Circuits Conference, 2001. ESSCIRC 2001. Proceedings of the 27th European Sep. 18-20, 2001, pp. 494-497.
H. Aytur, et al. "A Fully Integrated UWB PHY in 0.13 μm CMOS", ISSCC Dig. Tech. Papers, pp. 124-125, Feb. 2006.

* cited by examiner

*Primary Examiner* — Hirdepal Singh
(74) *Attorney, Agent, or Firm* — McGinn IP Law Group, PLLC (57) ABSTRACT

In the reception and demodulation of a communication signal with frequency hopping among a plurality of frequency bands, a demodulator is formed by a balance circuit. The demodulator performs frequency conversion by multiplying signals in_a and in_b, which are obtained by converting a received signal into differential signals, by local signals Lo_1a and Lo_1b with a frequency corresponding to a frequency band of the received signal, which are frequency-switched during a guard interval period of the received signal, in synchronization with a symbol of the received signal. Further, two output ends of the demodulator are charged/discharged through capacitors in synchronization with frequency switching of the local signal so that a voltage difference between the two output ends of the demodulator becomes a prescribed level.

7 Claims, 11 Drawing Sheets

RECEIVING APPARATUS AND SIGNAL PROCESSING METHOD

BACKGROUND OF THE INVENTION

1. Field of the Invention

The present invention relates to a radio receiving apparatus and, particularly, to a technique of receiving a frequency-hopping communication signal.

2. Description of Related Art

In the field of radio communication, a multicarrier transmission system is in the limelight as a technique of suppressing the effect of frequency selective fading. Because the multicarrier transmission system transmits data by dividing it into a plurality of carries with different frequencies, the frequency band of each carrier is narrow, so that it is less subject to the effect of frequency selective fading.

For example, in the orthogonal frequency-division multiplexing (OFDM), which is one of the multicarrier transmission system, the frequency of each carrier is set so that the carriers are orthogonal to each other within a symbol space. When transmitting data, the system performs the serial-to-parallel conversion of a serial signal in each symbol period to a plurality of pieces of data, and allocates the plurality of pieces of data respectively to a plurality of carriers. It then performs the modulation of the amplitude and the phase of each carrier. After that, the system performs the inverse FFT transform of the plurality of carriers so as to transform a frequency-based signal into a time-based signal while maintaining the orthogonality of each carrier which is exhibited in the frequency base, and finally transmits it. When receiving data, the reverse processes are performed. Specifically, the system performs the FFT transform so as to transform a time-based signal into a frequency-based signal, then performs the demodulation of each carrier corresponding to the modulation method, and finally performs the parallel-to-serial conversion to thereby obtain the original serial signal.

In the multiband-orthogonal frequency-division multiplexing (MB-OFDM) which is known as the ultra wide band (UWB) that employs the OFDM system, the frequency band of 3.1 to 10.6 GHz is divided into 14 bands at the frequency band of 528 MHz each. The 14 bands are then grouped into 5 band groups, each group including 3 or 2 bands, and an OFDM signal is transmitted with frequency hopping according to a time frequency code in each band group (cf. "High Rate Ultra Wideband PHY and MAC Standard", Ecma international standard ECMA-368 1st Edition, December 2005, pp. 7, 14-16).

Figure 7:
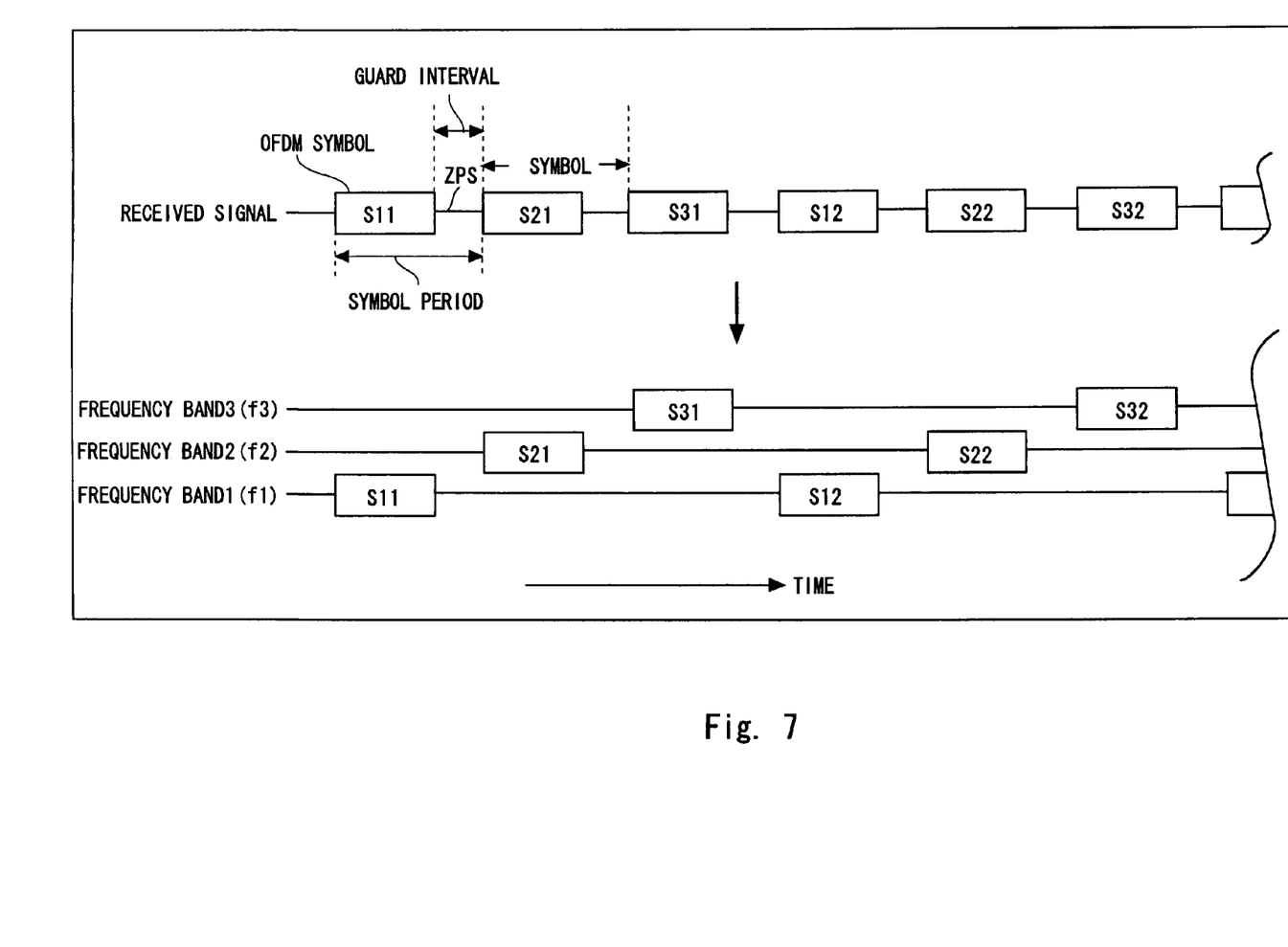
FIG. 7 is a view to explain frequency hopping.

FIG. 7 shows an example of a signal which is received by a receiving apparatus in the MB-OFDM communication system. The upper part of FIG. 7 shows the receiving signal in the received order, and the lower part of FIG. 7 shows the receiving signal in the upper part sorted into frequency bands. Note that, in the symbol "Sab" which represents an OFDM symbol, "a" indicates a frequency band, and "b" indicates the sequential number of an OFDM symbol in the frequency band. In the example described below, the number of frequency bands is three, the center frequencies of the three frequency bands are f1, f2 and f3, and the frequency hopping is repeated in the order of f1→f2→f3 within the band group.

As shown in FIG. 7, the first OFDM symbol S11 in the frequency band 1 with the center frequency f1 is received firstly. Next, the first OFDM symbol S21 in the frequency band 2 with the center frequency f2 is received. Then, the first OFDM symbol S31 in the frequency band 3 with the center frequency f3 is received. After that, the OFDM symbols S12, S22, S32 and so on are received sequentially. In this manner, a communication signal is transmitted with hopping among three frequency bands. Further, a zero-padded-suffix (ZPS) with a zero value is added to the end of each OFDM symbol as shown in FIG. 7, thereby keeping a guard interval and a time for switching center frequencies. In this description, the combination of an OFDM symbol and ZPS is collectively referred to as a symbol.

Figure 1:
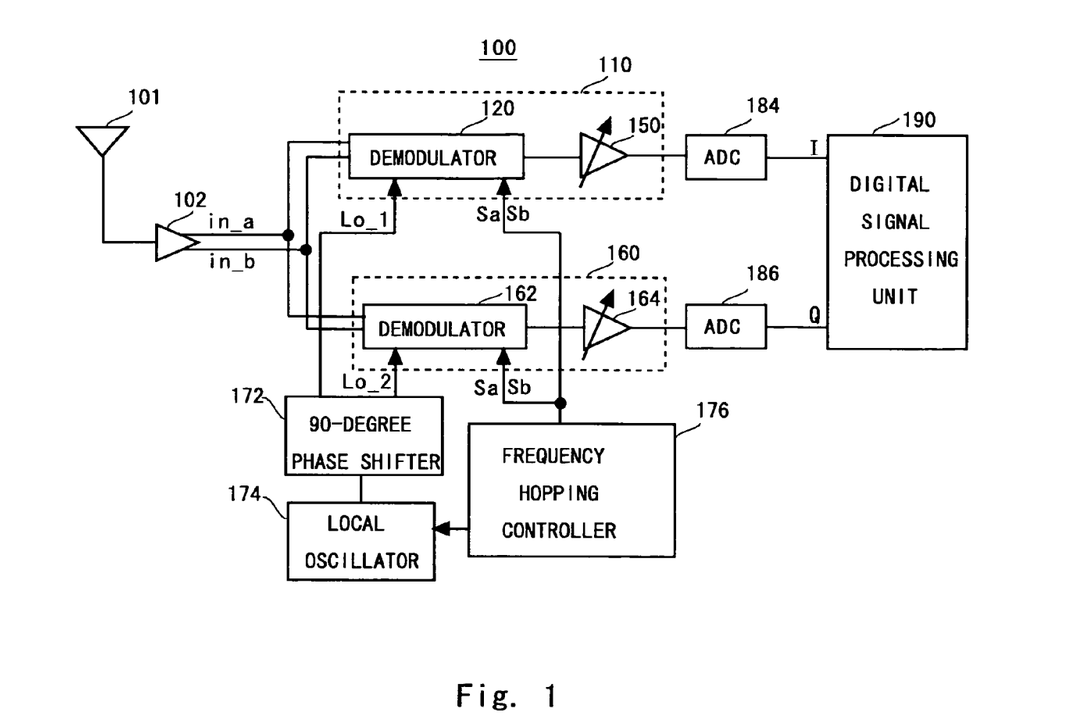
FIG. 1 is a view showing a receiving apparatus according to a first embodiment of the present invention.
Figure 8:
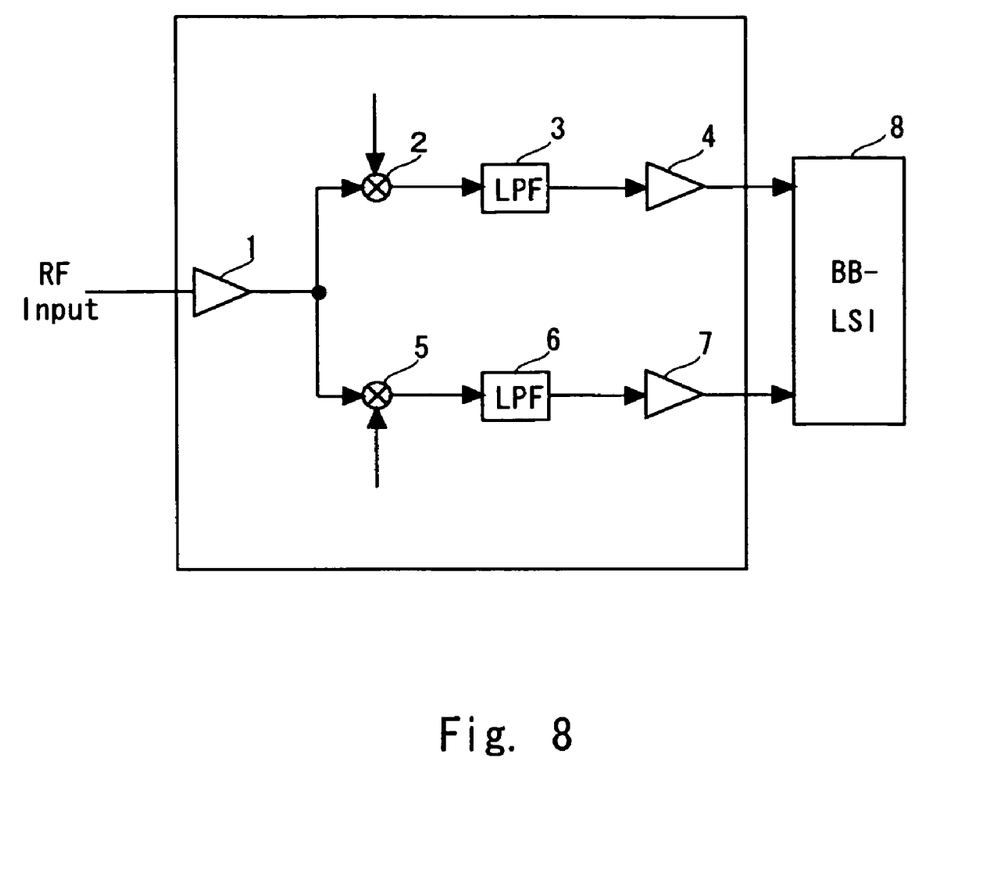
FIG. 8 is a view to explain a background art.

FIG. 8 shows a direct-conversion receiver as an example of a receiving apparatus of a radio communication system. The receiver in FIG. 8 is such that a symbol is assigned to each element in FIG. 1(a) of Satoshi Tanaka, Taizo Yamawaki, Kumiko Takikawa, Norio Hayashi, Ikuo Ohno, Tetsuya Wakuta, Satoru Takahashi, Masumi Kasahara, Bob Henshaw, "GSM/DCS1800 Dual Band Direct-Conversion Transceiver IC with a DC Offset Calibration System", Solid-State Circuits Conference, 2001. ESSCIRC 2001. Proceedings of the 27th European 18-20 Sep. 2001, pp. 494-497), for convenience of description. As shown in FIG. 8, a received signal RF Input is amplified by an amplifier 1 and supplied to two processing circuits. One of the two processing circuits includes a mixer 2, a low-pass filter 3 and an amplifier 4, and the other one includes a mixer 5, a low-pass filter 6 and an amplifier 7. The mixer 2 and the mixer 5 respectively receive local signals whose phases are different from each other by 90 degrees. Each mixer multiplies a communication signal by a local signal, so that frequency-conversion from an RF signal into a baseband signal is done. The low-pass filter 3 extracts low frequencies from the output of the mixer 2 and outputs it to the amplifier 4. The amplifier 4 amplifies the signal and outputs it to the baseband processing circuit 8. Likewise, the amplifier 7 amplifiers the low frequencies which are extracted from the output of the mixer 5 and outputs the amplified signal to the baseband processing circuit 8. The two signals which are input to the baseband processing circuit 8 are I-axis and Q-axis baseband signals. The baseband processing circuit 8 performs AD conversion, FFT transform or the like on those signals, thereby obtaining original information.

Because the above-described direct-conversion receiver directly frequency-converts a received signal into a baseband signal by multiplying the received signal by a local signal, it allows a receiver to have a wider band easier, thus increasing the flexibility of the configuration of the receiver. However, because the receiver of this system uses a local signal having the same frequency as the center frequency of a received signal, if the local signal leaks out and returns to the mixer, DC offset is generated in the output of the mixer due to the local signal's self mixing (LO self mixing). The DC offset is superimposed on a baseband signal to enlarge the voltage amplitude width of the signal, which causes signal distortion to occur due to saturation in the low-pass filter or the amplifier in the subsequent stage, leading to signal degradation. Further, if the voltage amplitude width of the signal which is input to an analog-to-digital converter (ADC) in an input unit of the baseband processing circuit 8 increases because of the above-described enlargement of the signal voltage amplitude width, it becomes problematic because it leads increase of the number of required bits for the ADC.

Figure 9:
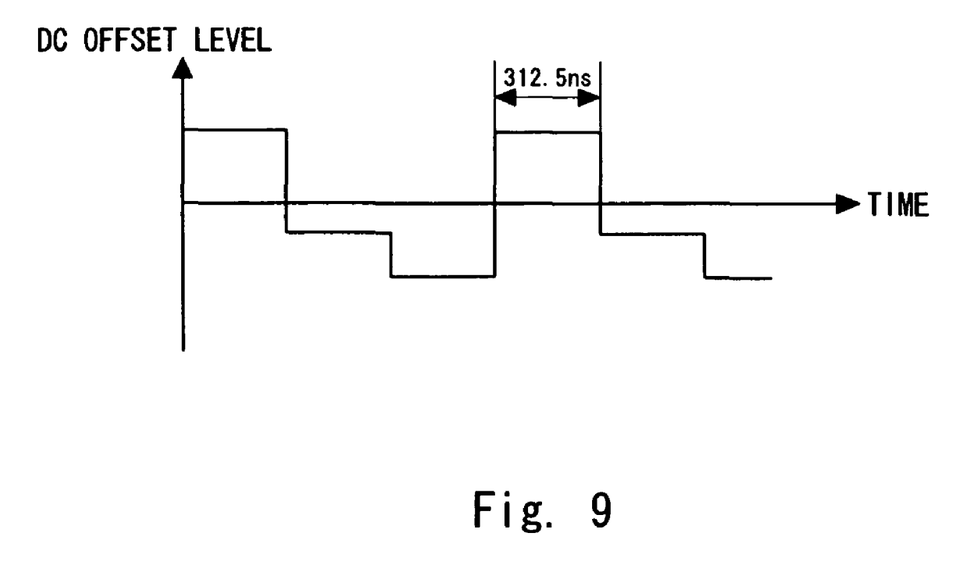
FIG. 9 is another view to explain a background art.

Because the MB-OFDM communication system transmits a signal with frequency hopping, it is necessary to switch the frequency of a local signal at a receiving side in synchronization with the frequency hopping. If the frequency of a local signal changes, the amount of DC offset which occurs in the mixer output changes accordingly due to a change in the amount of local signal leakage to the mixer input or the like. As a result, the DC offset in the mixer output in the MB-OFDM receiver changes step-like as shown in FIG. 9. Since the frequency of the frequency hopping is 3.2 MHz, which is the same as a symbol rate, the cycle of a change of DC offset is 1/3.2 MHz=312.5 ns.

A general method of removing DC offset in a baseband pass is to insert a capacitor in series to the output of a mixer which multiplies a received signal by a local signal frequency. This method cuts off DC component by a high-pass filter (HPF) which is formed by a capacitor C and a resistor R to thereby remove DC offset. The cutoff frequency of the HPF is 1/(2 pCR), and the convergence time of step response is 2 pCR. R indicates an input resistance of an amplifier or a filter which is connected to another end of the capacitor C that is connected to the mixer output.

Because the subcarrier frequency in the MB-OFDM communication is 4.125 MHz, it is necessary to pass up to 4.125 MHz in a receiver. If the cutoff frequency of the HPF is 4.125 MHz, the convergence time of step response is as long as 242 ns, so that a large part of the time in an OFDM symbol involves the step response. If the cutoff frequency is further reduced in order to make sure to pass a signal of 4.125 MHz, the response convergence time becomes so long that the DC offset does not become zero within one symbol but affects the next symbols.

Further, the MB-OFDM communication system performs frequency hopping for each symbol, and the switching time of the frequency is 9.47 ns. It is difficult to remove DC offset within such a short switching time. For example, according to the technique disclosed in Japanese Unexamined Patent Application Publication No. 2004-172693 (Ono et al), the DC offset correction takes 20 µs, and it is thus incapable of performing high-speed DC offset correction, which is required when receiving a communication signal in the MB-OFDM communication system.

Figure 10:
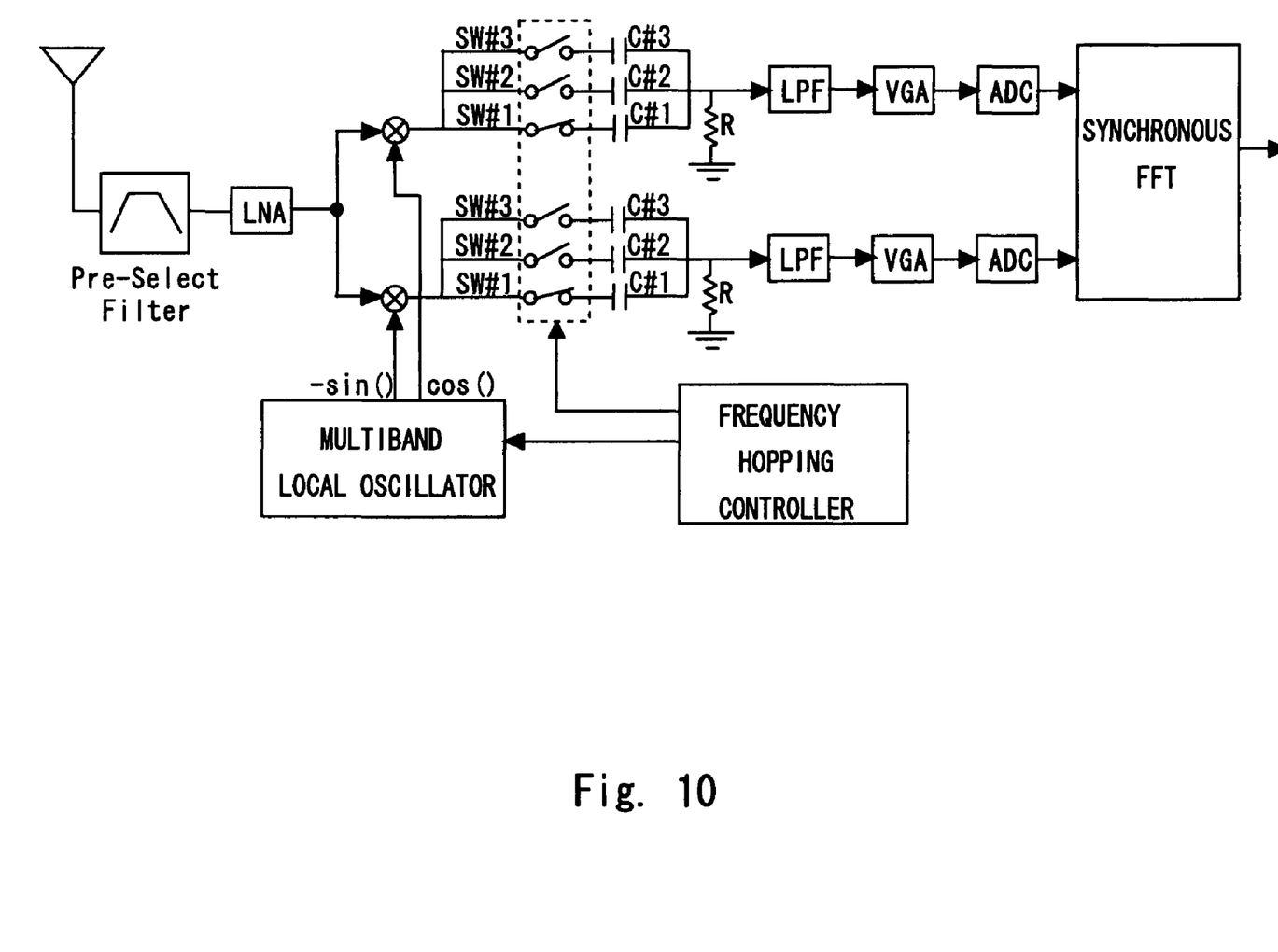
FIG. 10 is a view showing a receiving apparatus according to a related art.
Figure 11:
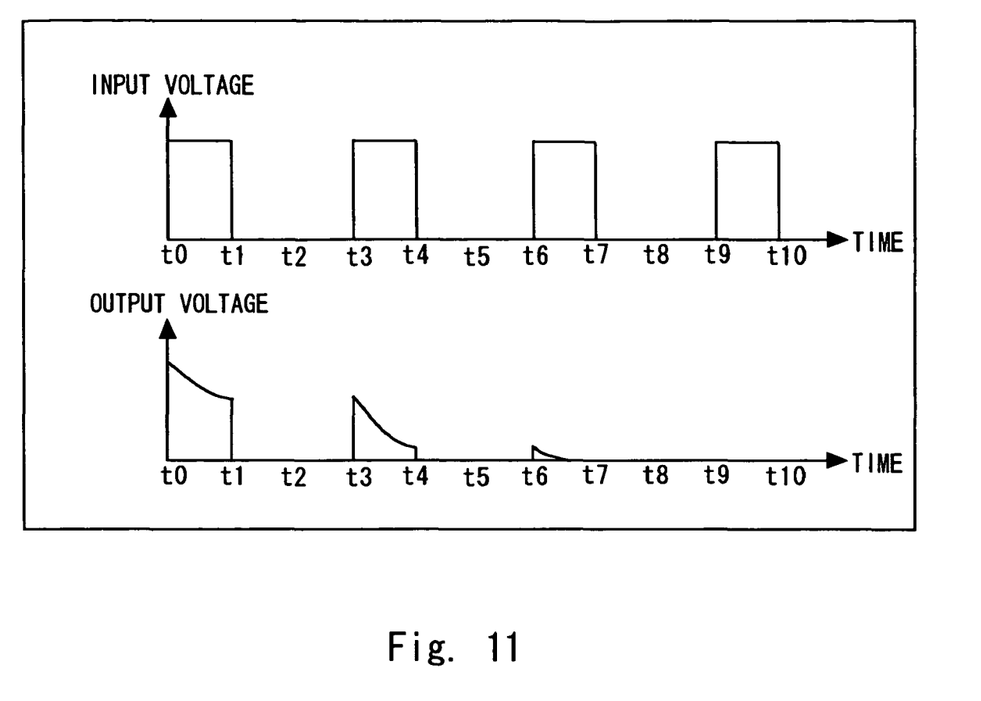
FIG. 11 is a view to explain an issue in a receiving apparatus shown in FIG. 10.

As an approach to the above issue, Japanese Unexamined Patent Application Publication No. 2006-203686 (Iida) discloses a technique of placing an RC circuit for each of frequency bands to be hopped and controls on/off of the switch in synchronization with frequency hopping, as shown in FIG. 10. According to the technique, a capacitor #1 holds electric charge and stops its step response just before frequency hopping from a frequency band #1 to another frequency band #2, and when hopping is performed to the frequency band #1 again, the capacitor #1 continues the step response. After repeating such a capacitor switching operation corresponding to the frequency hopping, the charge or discharge of the capacitor #1 ends to enter the steady state. FIG. 11 shows this process. The input voltage in the upper part of FIG. 11 is DC offset which occurs in a signal which is frequency-converted by a mixer at the frequency band #1, for example, and the lower part of FIG. 11 shows the voltage at the output end of the capacitor #1, which corresponds to the input voltage in the upper part. As shown in FIG. 11, after several symbols in the corresponding frequency bands (which is three symbols in the example of FIG. 11), the voltage at the output end of the capacitor becomes 0, and the DC offset is removed. Specifically, the technique performs the process of removing DC offset independently for each hopped frequency band, so that the transient step response which occurs in a certain frequency band does not affect the next hopped frequency band.

Further, H, Aytur et al. "A Fully Integrated UWB PHY in 0.13 µm CMOS", ISSCC Dig.Tech.Papers, pp. 124-125, February 2006 discloses a technique of placing a demodulator for each hopped frequency and switching demodulators according to the frequency of a symbol. The technique places a current digital-to-analog converter (IDAC) for correcting DC offset for each demodulator, adjusts each IDAC so that to perform an appropriate correction for each frequency bands. The technique then selects a demodulator and an IDAC output for DC offset correction according to the frequency hopping, so that voltage variation due to hopping does not occur in the output of the demodulator.

As described above, the technique taught by Iida requires several symbols until the charge of the capacitor completes, or until the DC offset is removed completely, for each frequency band to be hopped. Thus, at the start of hopping reception, DC offset remains in a baseband output over several symbols for each frequency band.

The technique taught by H, Aytur et al. requires the adjustment of IDAC and thus needs a time for the adjustment, which prevents prompt startup. Further, the technique requires a circuit and a sequence for adjusting IDAC, which causes an increase in circuit size.

SUMMARY

According to an embodiment of the present invention, there is provided a signal processing method. When receiving and demodulating a communication signal with frequency hopping among a plurality of frequency bands, the method forms a demodulator by a balance circuit, and frequency-converts a received signal into a baseband signal by the demodulator. The frequency conversion is performed by multiplying the received signal by a local signal with a frequency corresponding to a frequency band of the received signal, which is frequency-switched during a guard interval period in synchronization with a symbol of the received signal. Further, two output ends of the demodulator are charged or discharged through capacitors in synchronization with frequency switching of a local signal so that a voltage difference between the two output ends of the demodulator becomes a prescribed level.

The implementation of the above method as an apparatus or a system is also effective as another embodiment of the present invention.

The technique of the present invention reliably removes DC offset of a demodulator, while suppressing an increase in circuit size, when receiving a communication signal with frequency hopping among a plurality of frequency bands.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

Embodiments of the present invention are described hereinafter with reference to the drawings.

First Embodiment

FIG. 1 shows a receiving apparatus 100 according to a first embodiment of the present invention. The receiving apparatus 100 is such that a receiving apparatus according to the present invention is applied to a receiving side of the MB-OFDM communication system, and it is a radio receiving apparatus of direct-conversion type. As shown in FIG. 1, the receiving apparatus 100 includes an antenna 101 that acquires a communication signal (RF signal), a low noise amplifier 102 that amplifies the RF signal which is acquired by the antenna 101 and converts the signal into differential signals in_a and in_b. The receiving apparatus 100 also includes a first processing circuit 110 that obtain an I-axis signal from the differential signals in_a and in_b, an ADC 184, a second processing circuit 160 that obtain a Q-axis signal from the differential signals in_a and in_b, an ADC 186, and a digital signal processing unit 190 that performs signal processing in a subsequent stage to the ADC 184 and the ADC 186. The receiving apparatus 100 further includes a local oscillator 174 that generates a signal with a prescribed frequency according to control by a frequency hopping controller 176, which is described later, a 90-degree phase shifter 172 that outputs the signal generated by the local oscillator 174 as a local signal Lo_1 to the first processing circuit 110 and that shifts the phase of the signal generated by the local oscillator 174 by 90 degrees relative to the phase of Lo_1 and outputs it as a local signal Lo_2 to the second processing circuit 160, and the frequency hopping controller 176 that controls the first processing circuit 110, the second processing circuit 160, and the local oscillator 174.

In the MB-OFDM communication system, a signal is transmitted with frequency hopping for each symbol, and a guard interval where there is no signal exists between the OFDM symbols. The frequency hopping controller 176 generates a timing signal to switch local frequencies at a certain point within the guard interval in synchronization with the symbol of the received RF signal and thereby controls the frequency switching in the local oscillator 174. The way of controlling the first processing circuit 110 and the second processing circuit 160 by the frequency hopping controller 176 is described later in the detailed description of the first processing circuit 110 and the second processing circuit 160.

The first processing circuit 110 and the second processing circuit 160 have the same configuration and function except that the phases of input local signals are different by 90 degrees. Thus, only the first processing circuit 110 is described hereinbelow.

Figure 2:
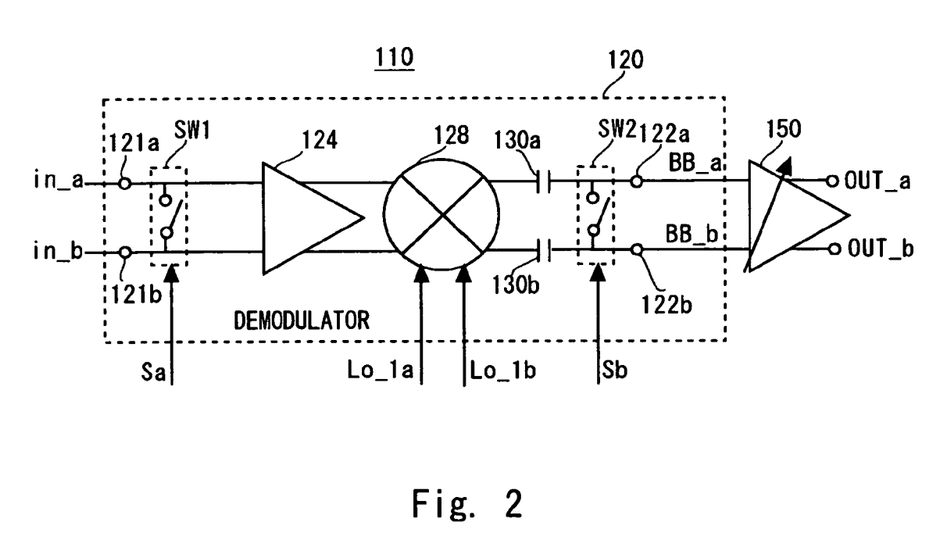
FIG. 2 is a view showing a first processing circuit in the receiving apparatus shown in FIG. 1.

FIG. 2 shows the configuration of the first processing circuit 110. The first processing circuit 110 is a balance circuit, and it includes a demodulator 120 that demodulates the differential signals in_a and in_b from the low noise amplifier 102 to obtain baseband signals BB_a and BB_b, and a variable gain amplifier 150 that amplifies the baseband signals BB_a and BB_b to obtain signals out_a and out_b to be supplied to the ADC 184 in the subsequent stage. In the description of the present invention, the "demodulator" means one (I-axis or Q-axis) demodulator of a quadrature demodulator that demodulates a quadrature modulated signal.

The demodulator 120 includes input terminals 121a and 121b that input differential signals in_a and in_b, respectively, a frequency converter 128 which serves as a mixer that multiplies the input differential signals in_a and in_b by differential local signals Lo_1a and Lo_1b, capacitors 130a and 130b that are respectively connected to the output ends of the frequency converter 128, and output terminals 122a and 122b that output the outputs of the demodulator 120, which are signals BB_a and BB_b having passed through the capacitors 130a and 130b, respectively. The demodulator 120 further includes a switch SW1 that short-circuits the input terminals 121a and 121b when it turns on, and a switch SW2 that short-circuits the output terminals 122a and 122b when it turns on. The on/off of the switches SW1 and SW2 is controlled by control signals Sa and Sb, respectively, from the frequency hopping controller 176. The local signal Lo_1a and the local signal Lo_1b are differential local signals.

Further, the demodulator 120 includes a buffer amplifier 124 between the input terminals 121a and 121b and the frequency converter 128, so that the differential signals in_a and in_b are input to the frequency converter 128 through the buffer amplifier 124.

Figure 3:
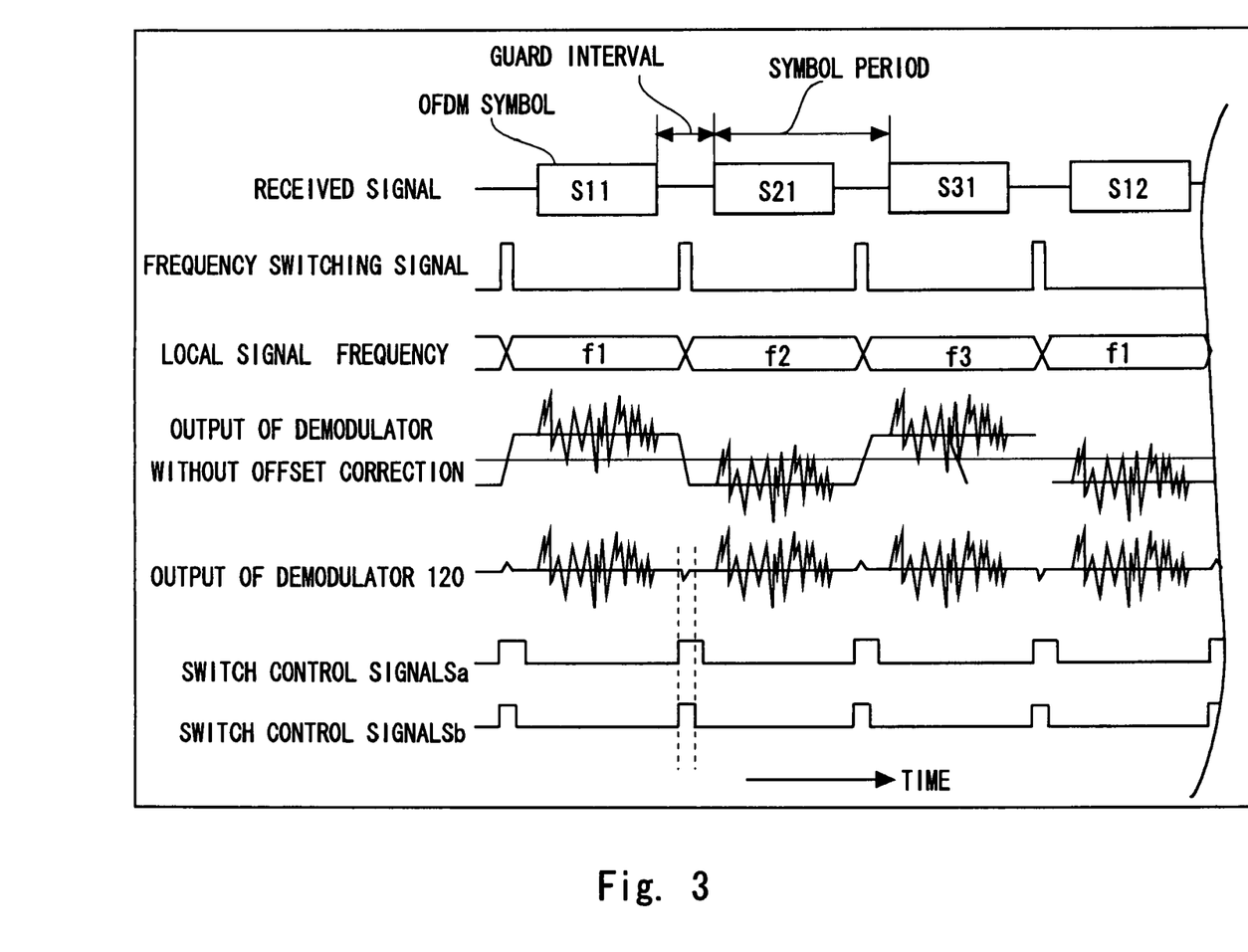
FIG. 3 is a view to explain a demodulator in the first processing circuit shown in FIG. 2.

FIG. 3 is a view to explain the operation of the demodulator 120 and the operation of the frequency hopping controller 176 related thereto. In the following example, a received signal is transmitted with frequency hopping in the order of f1, f2, f3, f1 . . . and so on. Referring to the uppermost part of FIG. 3, "x" in a symbol "Sxy" indicates the frequency (one of f1, f2 and f3) of the symbol, and "y" indicates a received order among the symbols with the same frequency.

As shown in FIG. 3, in the received signal, frequency hopping is performed for each symbol in the order of the frequency f1, f2 and f3. Further, a guard interval is interposed between the OFDM symbols.

In FIG. 3, a frequency switching signal is a control signal from the frequency hopping controller 176 to the local oscillator 174, and it causes switching of the frequency of the local signal which is generated by the local oscillator 174 during a guard interval in synchronization with a symbol. According to the frequency switching signal, the local oscillator 174 switches the frequency of a local signal to the frequency of the next symbol within a guard interval.

As described earlier, DC offset occurs in a frequency-converted signal due to self-mixing of the frequency converter 128 or the like. In this embodiment, the capacitors 130a and 130b are placed between the frequency converter 128 and the output terminal 122a and between the frequency converter 128 and the output terminal 122b, respectively, thereby cutting off the DC component which is contained in the output of the frequency converter 128. It is therefore possible to remove fixed DC offset from the baseband signals BB_a and BB_b which are the outputs of the demodulator 120.

However, the receiving apparatus 100 of this embodiment is a receiving apparatus of the MB-OFDM communication system which transmits a signal with frequency hopping among symbols, and the frequency of a local signal to be mixed with an RF signal is switched in synchronization with a symbol of the RF signal. Thus, during the hopping operation, the amount of leakage of a local signal which is given to the RF input terminal of the frequency converter 128 varies due to the frequency switching. Accordingly, the degree of the above-described self-mixing varies, and the amount of DC component in a baseband output signal changes as well.

In light of the foregoing, this embodiment places the switch SW2 in the demodulator 120 and turns on the switch SW2 in synchronization with the frequency switching of a local signal, thereby accumulating changes in DC component in the capacitors 130a and 130b. Specifically, the switch SW2 is controlled by the switch control signal Sb from the frequency hopping controller 176 so as to turn on or off according to the on/off signal of the switch control signal Sb. As shown in FIG. 3, the switch control signal Sb from the frequency hopping controller 176 becomes the ON signal in synchronization with frequency switching, and accordingly the switch SW2 turns on, thereby short-circuiting the output terminals 122a and 122b. As a result, a voltage difference between the output terminals 122a and 122b becomes essentially 0 due to the charge or discharge of the capacitors 130a and 130b. Consequently, in the output of the demodulator 120, the DC offset due to frequency hopping is removed as shown in FIG. 3.

The switch SW1 is described hereinbelow. During the guard interval period, although there is no input of an RF signal, there may be an input of noise from the antenna 101 or the low noise amplifier 102 to the demodulator 120. If the capacitors 130a and 130b are charged or discharged so as to bring a voltage difference between the output terminals 122a and 122b to essentially 0 with the noise being superimposed, the amount of displacement from zero due to the noise remains as DC component in the symbol period, which hinders the complete removal of DC offset. The switch SW1 is placed to address such an issue, and it is controlled by the switch control signal Sa from the frequency hopping controller 176 and turns on or off according to the on/off signal of the switch control signal Sa. As shown in FIG. 3, the switch SW1, just like the switch SW2, turns on in synchronization with frequency switching. As a result, the input terminals 121a and 121b are short-circuited, and the noise to be input to the demodulator 120 is cut off. In this state, if the capacitors 130a and 130b are charged or discharged so as to bring a voltage difference between the output terminals 122a and 122b to essentially 0, the effect of DC component of noise is eliminated, thereby improving the removal of DC offset.

Further, the level of self-mixing in the frequency converter 128 may depend on the impedance of an RF port of the frequency converter 128. In light of this, this embodiment places the buffer amplifier 124 between the switch SW1 and the frequency converter 128 so as to reduce the variations of the impedance of the RF port of the frequency converter 128 which are caused by on/off of the switch SW1, thereby further stabilizing the removal of DC offset.

The on/off timing of the switch SW1, the on/off timing of the switch SW2, and the timing of frequency switching of a local signal are described hereinafter.

The frequency switching of a local signal is performed during a guard interval period in synchronization with a symbol.

The switch SW1 and the switch SW2 turn on in synchronization with frequency switching. Moreover the switch SW1 and the switch SW2 turn on within the guard interval.

Because a change in DC offset occurs upon frequency switching of a local signal, the switch SW2 needs to stay on at least until the completion of frequency switching of a local signal in order to absorb the change.

Further, in order to make sure to perform noise cutting during the charge or discharge of the capacitors 130a and 130b by the switch SW2, the switch SW1 preferably turns on before the switch SW2 turns on, and turns off after the switch SW2 turns off.

Referring back to FIG. 3, as is obvious from the comparison between the output of the demodulator 120 in this embodiment and the output of a demodulator without DC offset compensation, this embodiment not only removes the DC offset due to the self-mixing of the frequency converter 128 but also eliminates a change in another DC offset due to frequency hopping, from the output of the demodulator 120.

Further, as described earlier, although the technique taught by Iida removes DC offset in each frequency band independently of each other and thereby eliminates the mutual effect of DC offset among frequency bands, it requires several symbols until DC offset is removed for one frequency band. On the other hand, the demodulator 120 of this embodiment enables removal of DC offset for each guard interval, therefore each symbol by symbol, from the start of reception, irrespective of a frequency band. Furthermore, this embodiment implements such functions with a simple configuration, thus suppressing an increase in circuit size.

Second Embodiment

According to the first embodiment of the present invention shown in FIG. 1, the output terminals 122a and 122b of the demodulator 120 are short-circuited by the switch SW2 in synchronization with frequency switching of a local signal, thereby accumulating changes in DC offset due to frequency hopping in the capacitors 130a and 130b so as to substantially eliminate a voltage difference between the output terminals 122a and 122b. Another technique may be used as long as the changes in DC offset due to frequency hopping can be accumulated in the capacitors 130a and 130b during the guard interval period so that a voltage difference between the output terminals 122a and 122b is substantially eliminated. As a second embodiment, another demodulator which may be used in the receiving apparatus 100 is described hereinafter with reference to FIG. 4.

Figure 4:
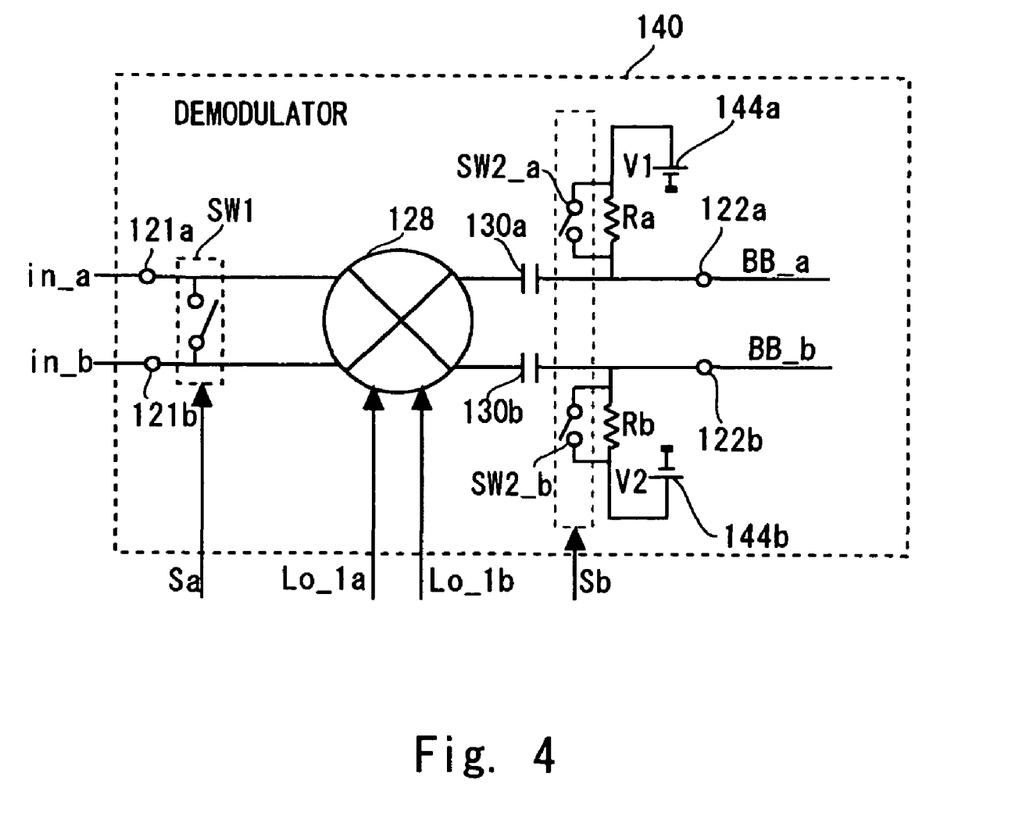
FIG. 4 is a view showing a demodulator according to a second embodiment of the present invention.

FIG. 4 shows a demodulator 140. In the followings, only differences between the demodulator 140 and the demodulator 120 are described, and the same elements as the demodulator 120 are not described and denoted by the same reference symbols.

The demodulator 140 includes a voltage source 144a which is connected through a resistor Ra between the capacitor 130a and the output terminal 122a, and a voltage source 144b which is connected through a resistor Rb between the capacitor 130b and the output terminal 122b, instead of the switch SW2 in the demodulator 120. Further, the demodulator 140 includes switches SW2_a and SW2_b. When the switch SW2_a turns on, the capacitor 130a is directly connected to the voltage source 144a, and when it turns off, the capacitor 130a is connected to the voltage source 144a through the resistor Ra. Likewise, when the switch SW2_b turns on, the capacitor 130b is directly connected to the voltage source 144b, and when it turns off, the capacitor 130b is connected to the voltage source 144b through the resistor Rb. Like the switch SW2, the on/off of the switches SW2_a and SW2_b is controlled by the frequency hopping controller 176, and the timing is the same as the case of switch SW2 in the first embodiment. Voltages V1 and V2 which are supplied from the voltage source 144a and the voltage source 144b, respectively, are the same in the demodulator 140. The voltage source 144a and the voltage source 144b may be a bias circuit or a voltage setting circuit by DAC or the like.

Specifically, in the demodulator 140 shown in FIG. 4, the switch SW2_a turns on in synchronization with frequency switching of a local signal. Thus, the capacitor 130a is directly connected to the voltage source 144a and thereby charged or discharged. Likewise, the switch SW2_b turns on in synchronization with frequency switching. Thus, the capacitor 130b is directly connected to the voltage source 144b. As a result, the voltages at the output terminals 122a and 122b become essentially equal, so that a voltage difference between the output terminals 122a and 122b is essentially 0.

In this configuration, the demodulator 140 prevents DC offset due to frequency hopping from being superimposed on the outputs BB_a and BB_b, thus having the same advantages as the demodulator 120.

Although the buffer amplifier 124, which is used in the demodulator 120, is not placed in this example for convenience of description, the buffer amplifier 124 may be placed between the switch SW1 and the frequency converter 128 of the demodulator 140 in order to stabilize the removal of DC offset.

Third Embodiment

Figure 5:
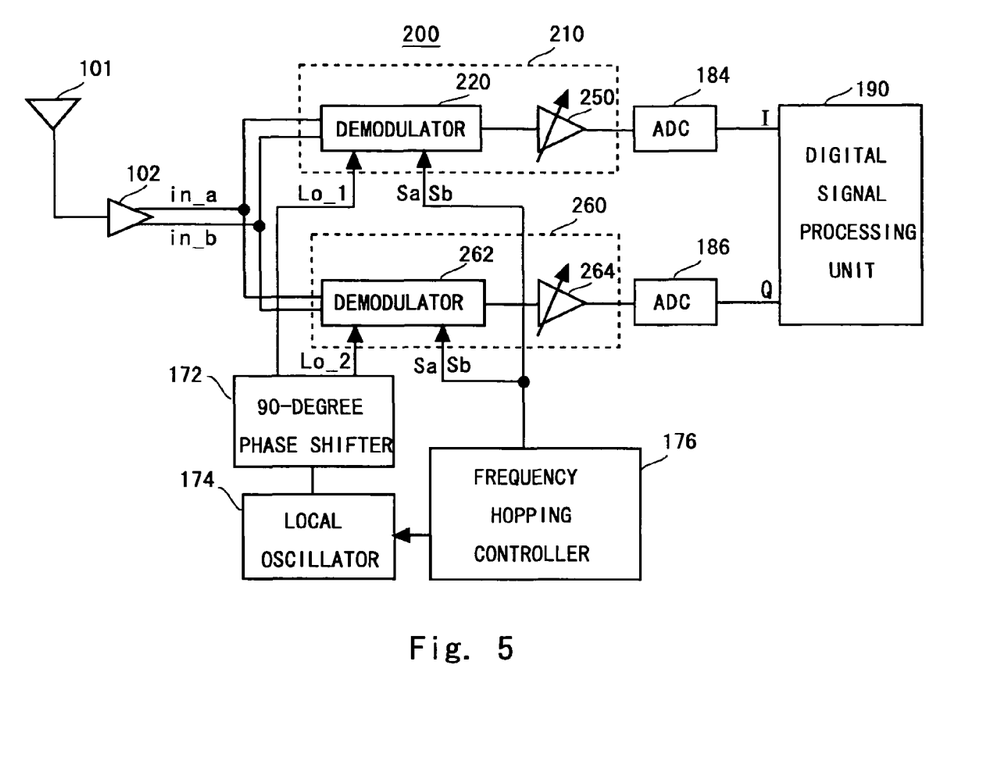
FIG. 5 is a view showing a receiving apparatus according to a third embodiment of the present invention.

FIG. 5 shows a receiving apparatus 200 according to a third embodiment of the present invention. The receiving apparatus 200 is also a receiving apparatus in the MB-OFDM communication system, and it has a functional block having the same function as each element of the receiving apparatus 100 shown in FIG. 1. In the receiving apparatus 200, a first processing circuit 210 and a second processing circuit 260 are different from the first processing circuit 110 and the second processing circuit 160 in the receiving apparatus 100. The other elements are the same as equivalent elements in the receiving apparatus 100, and they are denoted by the same reference symbols as in the receiving apparatus 100 and not described in detail herein.

The first processing circuit 210 and the second processing circuit 260 have the same configuration and function except that the phases of input local signals are different by 90 degrees. Thus, only the first processing circuit 210 is described hereinbelow.

Figure 6:
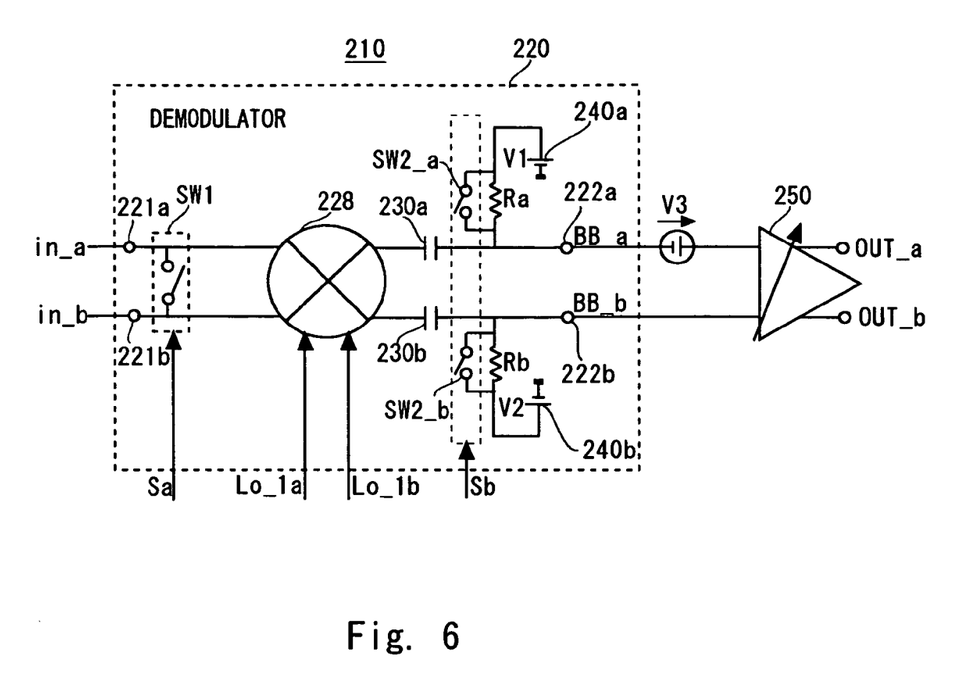
FIG. 6 is a view showing a first processing circuit in a receiving apparatus shown in FIG. 5.

FIG. 6 shows the first processing circuit 210 in the receiving apparatus 200. The first processing circuit 210 is a balance circuit, and it includes a demodulator 220 that demodulates the differential signals in_a and in_b to obtain baseband signals BB_a and BB_b, and a variable gain amplifier 250 that amplifies the baseband signals BB_a and BB_b to obtain signals out_a and out_b to be supplied to the subsequent stage.

The demodulator 220 includes input terminals 221a and 221b that input differential signals in_a and in_b, respectively, a frequency converter 228 which serves as a mixer that multiplies the input differential signals in_a and in_b by differential local signals Lo_1a and Lo_1b, respectively, capacitors 230a and 230b that are respectively connected to the output ends of the frequency converter 228, and output terminals 222a and 222b that output the outputs of the demodulator 220, which are signals BB_a and BB_b having passed through the capacitors 230a and 230b, respectively. The demodulator 220 further includes a switch SW1 that short-circuits the input terminals 221a and 221b when it turns on.

Further, the demodulator 220 includes a voltage source 240a which is connected through a resistor Ra between the capacitor 230a and the output terminal 222a, and a voltage source 240b which is connected through a resistor Rb between the capacitor 230b and the output terminal 222b. The demodulator 220 also includes switches SW2_a and SW2_b. When the switch SW2_a turns on, the capacitor 230a is directly connected to the voltage source 240a, and when it turns off, the capacitor 230a is connected to the voltage source 240a through the resistor Ra. Likewise, when the switch SW2_b turns on, the capacitor 230b is directly connected to the voltage source 240b, and when it turns off, the capacitor 230b is connected to the voltage source 240b through the resistor Rb. Like the switch SW2 in the demodulator 120 of the receiving apparatus 100 described earlier, the on/off of the switches SW2_a and SW2_b is controlled by the frequency hopping controller 176, and the timing is the same as the case of switch SW2.

Specifically, the switch SW2_a turns on in synchronization with frequency switching of a local signal. Thus, the capacitor 230a is directly connected to the voltage source 240a and it is thereby charged or discharged instantaneously. Likewise, the switch SW2_b turns on in synchronization with frequency switching of a local signal. Thus, the capacitor 230b is directly connected to the voltage source 240b and it is thereby charged or discharged instantaneously. As a result, a voltage difference between the output terminals 222a and 222b essentially equals a level difference between the voltages V1 and V2 which are supplied from the voltage source 240a and the voltage source 240b.

The levels of the voltages V1 and V2 are described later.

Although V3 indicating a voltage source is illustrated before the variable gain amplifier 250 in FIG. 6, this is illustrated only for convenience of description, and it does not mean that a power supply is placed. Generally in a variable gain amplifier, offset exists in an input. The element V3 illustrated in FIG. 6 is an equivalent input offset voltage of the variable gain amplifier 250.

In order to cancel the DC offset voltage V3 which exists in the input of the variable gain amplifier 250, the configuration that subtracts V3 is needed. Specifically, if the input DC offset correction voltage V3 is subtracted from the outputs BB_a and BB_b of the demodulator 220 before they are input to an amplifier 252 of the variable gain amplifier 250, the DC offset of the variable gain amplifier 250 can be corrected.

In the receiving apparatus 200 of this embodiment, the voltage source 240a and the voltage source 240b have a function to cancel the input offset V3 of the variable gain amplifier 250. Specifically, in order to cancel the DC offset voltage V3 by a level difference between the voltage V1 of the voltage source 240a and the voltage V2 of the voltage source 240b, the levels of the voltages V1 and V2 are set to satisfy the following expression:

$$V1-V2=-V3 \quad \text{Expression 1}$$

As described earlier, the switches SW2_a and SW2_b turn on in synchronization with frequency switching of a local signal, and a voltage difference between the output terminals 222a and 222b thereby becomes essentially equal to a level difference between the voltages V1 and V2. If the voltages V1 and V2 satisfy the relationship of the above expression (1), a voltage difference between the output terminals 222a and 222b cancels out the input offset V3 of DC offset in the variable gain amplifier 250. As a result, it is possible to achieve the correction of the DC offset caused by frequency hopping and the correction of the input offset of the variable gain amplifier 250 at the same time in the demodulator 220.

As described above, the receiving apparatus 200 of this embodiment enables both the removal of DC offset of the demodulator 220 and the correction of input offset of the variable gain amplifier 250 in the first processing circuit 210.

Consequently, DC offset is removed from the outputs out_a and out_b of the variable gain amplifier 250, or the signal which is input to the ADC in the subsequent stage, thereby preventing saturation of the ADC in the subsequent stage, an increase in the number of bits, and so on.

Although the embodiments of the present invention are described in the foregoing, the present invention is not restricted to the above-described embodiments, and various changes and modifications may be made without departing from the scope of the invention. All such changes and modifications as would be obvious to one skilled in the art are intended for inclusion within the scope of the present invention.

For example, although a low-pass filer (LPF) is not illustrated in the description of each of above embodiments for convenience of description, an LPF may be placed before or after the variable gain amplifier.

Further, the number of variable gain amplifier in one processing circuit is not limited to one, and a plurality of variable gain amplifiers in a plurality of stages, such as a previous stage and a subsequent stage, may be placed.

Further, in each of the above-described embodiments, the switch SW1 which operates as a blocking circuit to block an input to the demodulator in the period when the two output ends of the demodulator are charged or discharged through the capacitors is placed in the previous stage of the demodulator. However, the blocking circuit is not necessarily placed in the previous stage of the demodulator as long as it has the same function as the SW1. For example, the blocking circuit may be placed in any position between the antenna that receives an RF signal and the demodulator. Further, an input signal is not necessarily blocked between balance signals, and it may be blocked by short-circuiting an unbalance signal to the AC ground.

Further, a receiving apparatus which does not include the buffer amplifier 124 for stabilizing the removal of DC offset, which is placed in the first processing circuit shown in FIG. 2, is also included within the scope of the present invention.

Although each of the above-described embodiments applies the technique of the present invention to a receiving apparatus of the MB-OFDM communication system, the technique of the present invention may be applied to any apparatus that receives a communication signal with frequency hopping among a plurality of frequency bands.

It is apparent that the present invention is not limited to the above embodiments, but may be modified and changed without departing from the scope and spirit of the invention.

What is claimed is:

1. A receiving apparatus that receives and processes a communication signal with frequency hopping among a plurality of frequency bands, said receiving apparatus comprising:
   a demodulator to demodulate a received signal; and
   a local signal generator to generate a local signal with a frequency corresponding to a frequency band of the received signal and output the local signal to the demodulator, the local signal generator performing a frequency switching of the local signal during a guard interval period of the received signal,
   wherein the demodulator is formed by a balance circuit,
   wherein the demodulator includes:
   a frequency converter to perform a frequency conversion by multiplying the received signal, which is converted into differential signals, by the local signal and obtain differential outputs;
   two capacitors, with one end of each of the two capacitors is respectively connected to one of two outputs of the differential outputs of the frequency converter; and
   a charge/discharge circuit to cause the two capacitors to perform a charge/discharge in synchronization with the frequency switching of the local signal so that a voltage difference between other ends of the two capacitors becomes a prescribed level,
   wherein the charge/discharge circuit causes the charge/discharge to be performed in synchronization with the frequency switching of the local signal so that voltages at the other ends of the two capacitors become essentially equal,
   wherein the charge/discharge circuit is placed for each of the two capacitors,
   wherein the charge/discharge circuit includes:
   two voltage sources, each connected to the other end of one of the two capacitor through a respective resistor; and
   a switch circuit to directly connect the two voltage sources to the other end of the respective capacitor by turning on in synchronization with the frequency switching of the local signal, and
   wherein the two voltage sources have a same voltage level.

2. The receiving apparatus according to claim 1, further comprising:
   a blocking circuit placed before the demodulator, to block an input to the demodulator during a period when charge/discharge is performed by the charge/discharge circuit.

3. The receiving apparatus according to claim 2, further comprising:
   a buffer amplifier between the blocking circuit and the demodulator.

4. A receiving apparatus that receives and processes a communication signal with frequency hopping among a plurality of frequency bands, said receiving apparatus comprising:
   a demodulator to demodulate a received signal;
   a local signal generator to generate a local signal with a frequency corresponding to a frequency band of the received signal and output the local signal to the demodulator, the local signal generator performing a frequency switching of the local signal during a guard interval period of the received signal; and
   a variable gain amplifier to amplify an output of the demodulator,
   wherein the demodulator is formed by a balance circuit,
   wherein the demodulator includes:
   a frequency converter to perform a frequency conversion by multiplying the received signal, which is converted into differential signals, by the local signal and obtain differential outputs;
   two capacitors, with one end of each of the two capacitors is respectively connected to one of two outputs of the differential outputs of the frequency converter; and
   a charge/discharge circuit to cause the two capacitors to perform charge/discharge in synchronization with the frequency switching of the local signal so that a voltage difference between other ends of the two capacitors becomes a prescribed level,
   wherein the charge/discharge circuit causes the two capacitors to perform charge/discharge in synchronization with the frequency switching so that the voltage difference between the other ends of the two capacitors reduces a DC offset of the variable gain amplifier,
   wherein the charge/discharge circuit is placed for each of the two capacitors, and
   wherein the charge/discharge circuit includes:
   two voltage sources, each connected to the other end of one of the two capacitor through a respective resistor; and a switch circuit to directly connect the two voltage sources to the other end of the respective capacitor by turning on in synchronization with the frequency switching of the local signal, and wherein voltage levels of the two voltage sources are set so that a difference in the voltage levels reduces the DC offset of the variable gain amplifier.

5. A signal processing method for receiving and demodulating a communication signal with frequency hopping among a plurality of frequency bands, said signal processing method comprising:

forming a demodulator by a balance circuit;

performing, by the demodulator, a frequency conversion by multiplying a received signal, which is converted into differential signals, by a local signal with a frequency corresponding to a frequency band of the received signal, the local signal being frequency-switched during a guard interval period of the received signal; and performing charge/discharge of two output ends of the demodulator through two capacitors in synchronization with the frequency switching of the local signal so that a voltage difference between the two output ends of the demodulator becomes a prescribed level, wherein the charge/discharge is performed in synchronization with the frequency switching of the local signal so that voltages at the two output ends of the demodulator become essentially equal, wherein one end of each of the two capacitors is respectively connected to one of the two output ends of the demodulator, and the other end of each of the two capacitors is respectively connected to one of two voltage sources through a respective resistor, wherein the other end of each of the two capacitors is connected to the corresponding voltage source in synchronization with the frequency switching of the local signal, and wherein voltage levels of the two voltage sources are essentially equal.

6. The signal processing method according to claim 5, wherein
an input to the demodulator is blocked during charge/discharge of the two output ends of the demodulator through the capacitors.

7. A signal processing method for receiving and demodulating a communication signal with frequency hopping among a plurality of frequency bands, said signal processing method comprising:

forming a demodulator by a balance circuit;

performing, by the demodulator, a frequency conversion by multiplying a received signal, which is converted into differential signals, by a local signal with a frequency corresponding to a frequency band of the received signal, the local signal being frequency-switched during a guard interval period of the received signal; and performing charge/discharge of two output ends of the demodulator through two capacitors in synchronization with the frequency switching of the local signal so that a voltage difference between the two output ends of the demodulator becomes a prescribed level, wherein the charge/discharge is performed in synchronization with the frequency switching so that the voltage difference between the two output ends of the demodulator reduces a DC offset of a variable gain amplifier that amplifies the output of the demodulator, wherein one end of each of the two capacitors is respectively connected to one of the two output ends of the demodulator, and the other end of each of the two capacitors is respectively connected to one of two voltage sources through a respective resistor, wherein the other end of each of the two capacitors is connected to the corresponding voltage source in synchronization with the frequency switching of the local signal, and wherein voltage levels of the two voltage sources are set so that a difference in the voltage levels of the two voltage sources reduces the DC offset of the variable gain amplifier.

* * * * *